Figures 1, 4:
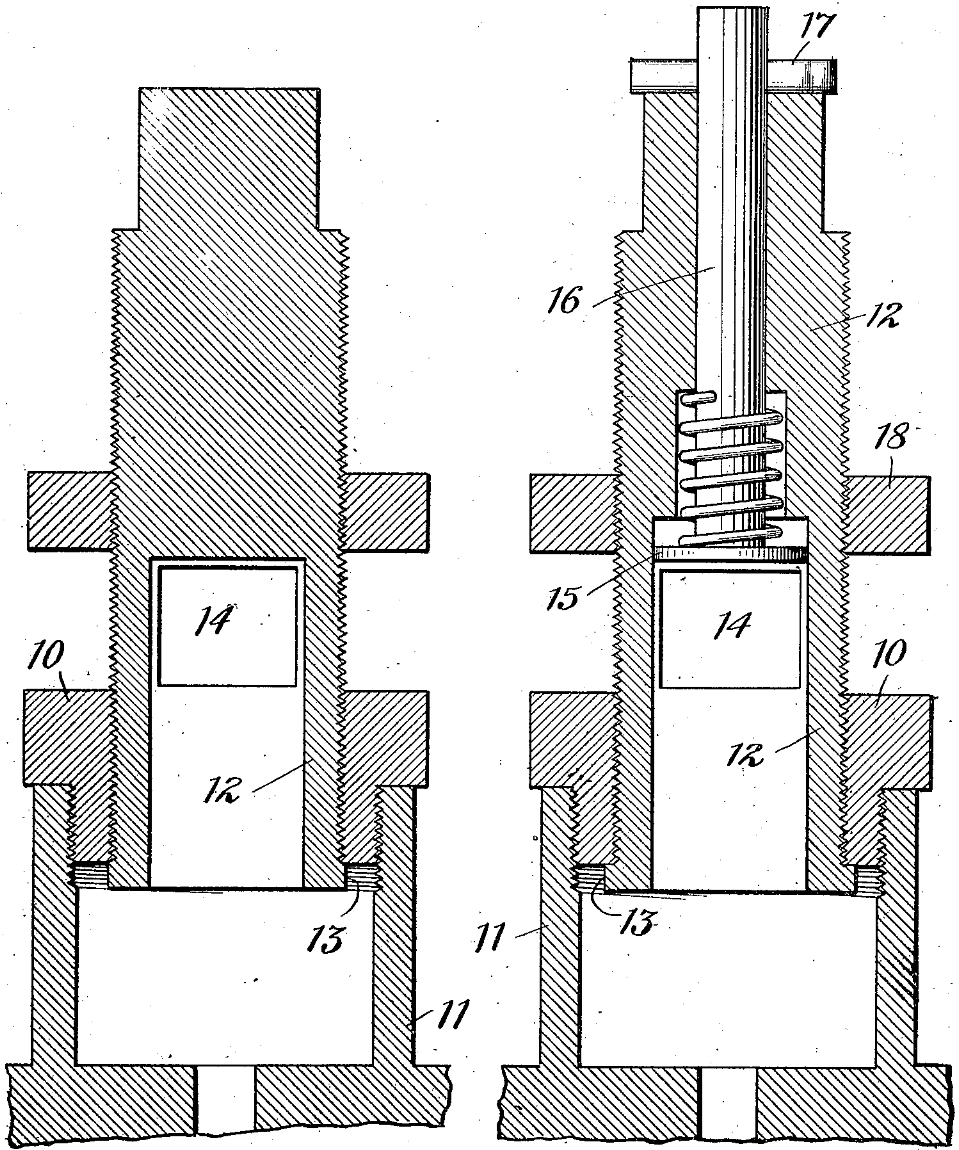

J. E. McDANIEL.
GREASE COMPRESSOR FOR ENGINE RODS.
APPLICATION FILED OCT. 25, 1913.

1,111,755.

Patented Sept. 29, 1914.

2 SHEETS—SHEET 1.

Witnesses
H. Lowenstein
James H. Marr

Inventor
James Edwin McDaniel

By Edward E. Clement
Attorney

J. E. McDANIEL.
GREASE COMPRESSOR FOR ENGINE RODS.
APPLICATION FILED OCT. 25, 1913.
1,111,755.
Patented Sept. 29, 1914.
2 SHEETS—SHEET 2.
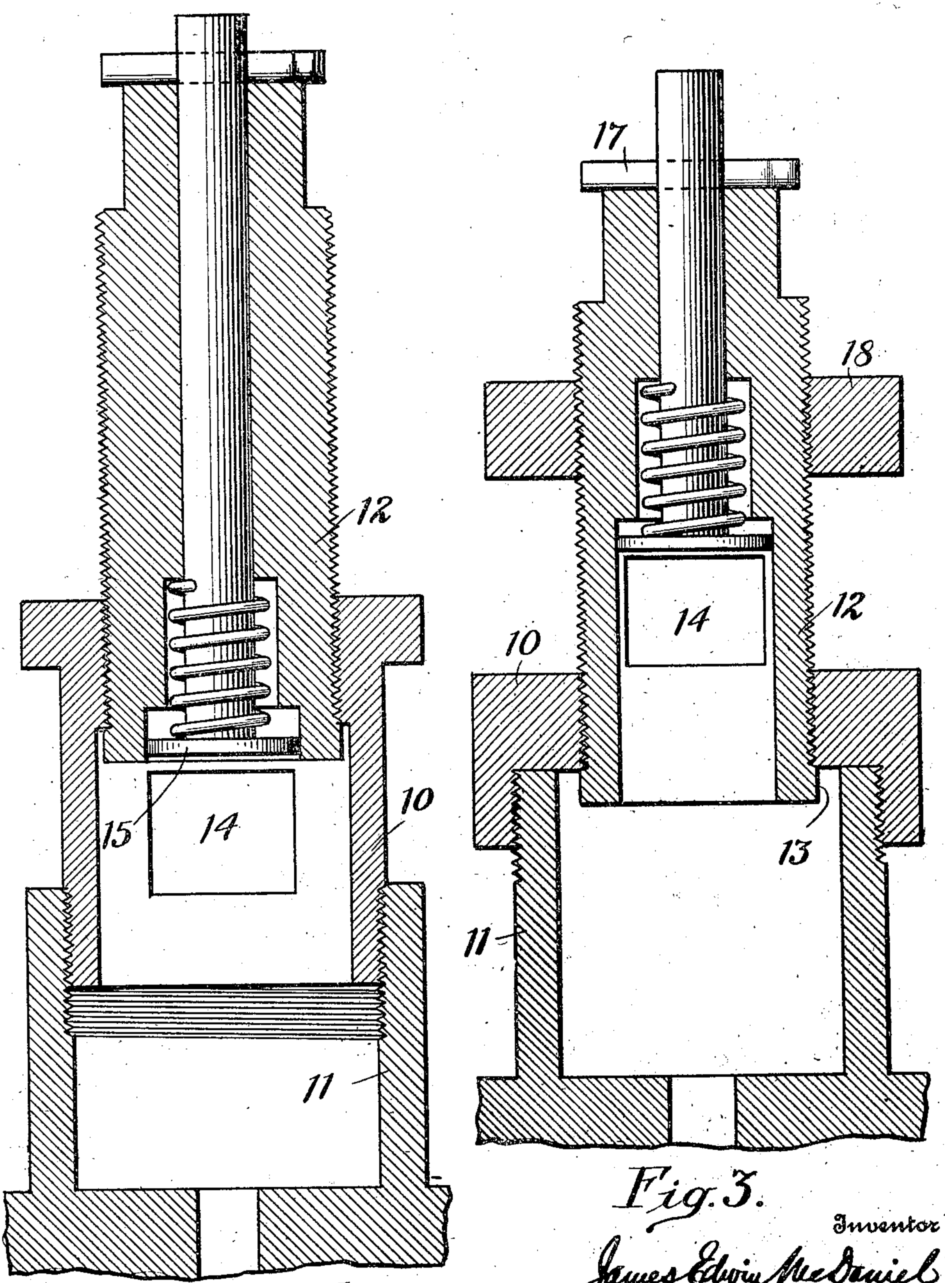
Witnesses
H. J. Lowenstein.
James H. Marr
Inventor
James Edwin McDaniel
By Edward Clement
Attorney

UNITED STATES PATENT OFFICE.

JAMES E. McDANIEL, OF COLUMBIA, SOUTH CAROLINA.

GREASE-COMPRESSOR FOR ENGINE-RODS.

1,111,755. Specification of Letters Patent. Patented Sept. 29, 1914.

Application filed October 25, 1913. Serial No. 797,286.

*To all whom it may concern:*

Be it known that I, JAMES E. McDANIEL, a citizen of the United States, residing at Columbia, in the county of Richland and State of South Carolina, have invented certain new and useful Improvements in Grease-Compressors for Engine-Rods, of which the following is a specification, reference being had therein to the accompanying drawing.

My invention relates to grease compressor cups of the type in which hard grease is used, the compressing element being screw threaded into some part of the reservoir which holds the grease and being turned or released from time to time to compress the grease and feed the same to the part to be lubricated as the grease is melted by the heat of the friction of the part. Extremely severe conditions of service are found in connection with the lubrication of the connecting and side rods of steam locomotives, and the principal object of my invention is the construction of a compressor grease cup which will meet these severe conditions of service present in connection with all bearings of the type specified. It has heretofore been characteristic of lubricating devices designed to meet these conditions that they have been made as simple and as sturdy as possible. According to common practice, a heavy compressing stud or stopper has been removably threaded into the grease reservoir. In so making them, however, several very important practical factors have been overlooked. Chief among these is the fact that oilers and firemen working around locomotives are often very careless in handling these devices, and when not so careless, have a very limited time during stops in which to run over, replenish, and adjust all of the various devices connected with their engines. The result is that despite the simplicity and strength of these devices, the threads are often stripped one by one, and the compressing member jars out and becomes lost during the run. It is a well known fact that in the course of a year, tons (literally) of the compressing elements of these devices are lost by the road-side, or are thrown away at the round houses when the threads have become worn. This wearing and stripping of the threads is caused through improper or insufficient entry of the threads of the compressing member which in the usual form of compressing cup is removed from the cup proper (which is formed integral with the rod) to fill the same. Under such conditions a slight force applied to a heavy wrench will strip a couple of threads, and when one or two threads become stripped, it is only a short time before others are stripped and the device is soon disabled. Another factor commonly overlooked, is the uniform compression of the grease in the cup. Especially in case the compressor has been hurriedly filled, and a few turns hurriedly taken, the quantity of lubricant fed by the compressor is variable and uncertain. Where lubrication is as important as it is in the connecting and side rods of locomotives, there should be no uncertainty concerning the feed. I aim to eliminate the trouble thus stated, and produce a compressor grease cup which will meet exacting conditions, in the manner hereinafter described.

In the accompanying drawings I show several embodiments of my invention, but as is usual in case of inventions of this character, it is capable of still other embodiments by those skilled in the art.

Referring to the drawings, Figure 1 shows the principal form of my compressor, Fig. 2 shows a second form thereof, Fig. 3 shows a third form thereof, and Fig. 4 shows a fourth form thereof.

The form of Fig. 1 comprises a bushing 10 exteriorly threaded into the cup 11 which in the case of locomotive connecting and side rods is formed integral with the rod itself. This bushing is also interiorly screw threaded, and threaded within it from the bottom is a compressor member 12. This compressor member is provided at its lower end with an annular exterior flange 13, formed specially, or else created by virtue of a termination of the screw threads on the exterior of member 12 at a point above its lower end. In the form of Fig. 1, the annular flange 13 is specially formed, while in the form of my invention of Fig. 2, the flange 13 is created by the termination of the exterior screw threads specified.

The compressor member 12 is recessed from the bottom, and is provided with a laterally disposed aperture 14 communicating with the recess. The position of this aperture is such that when the compressor member 12 is screwed out of the bushing to its uppermost limit as determined by the flange 13, the aperture is opened, but when the compressor member 12 is screwed down into the bushing 10, the aperture 14 is closed by the telescoping walls. At the upper end of the recess of the compressor member is located a spring pressed piston 15 mounted on a rod 16 which rod passes through the top of the compressor member 12 and is retained in position by means of a split pin or other transversely extending device 17 which bears upon the top of the member 12. The top end of the member 12 is squared or otherwise faced off for the reception of a suitable wrench, and is of smaller section than the main body of the member. The proportion of the spring surrounding the rod 16, and the length of the rod are made such that the range of movement of the piston 15 is of limited extent and less than the range of movement of the compressor member 12 in the bushing 10, the piston normally occupying a position with its lower face opposite the upper edge of the aperture 14 or slightly below the same.

With the parts in the relative positions shown, the compressor is filled with grease which is introduced through the aperture 14. Thereupon the compressor member 12 is screwed into the bushing until the aperture 14 is closed by the bushing, and further until the piston 15 bears upon the top of the introduced grease, the piston being forced back against the pressure of the associated spring until it brings up against the top of the recess in which it lies, or to a less degree should that be desired. Thereupon the jam nut 18 which is threaded on to the compressor member 12 from the top, is forced into place by a suitable wrench, and the lubricated part is ready for a run.

In applying the compressor, the bushing 10, which is of the form usually found in connection with the compressors at present in use, is screwed up into the cup 11 under great pressure, and is not removable therefrom by the application of an ordinary pressure. By virtue of an annular flange 13 on the compressor member 12, it is impossible for the careless attendant to remove the compressor member 12 by way of the top of the bushing or from threaded engagement therewith. The result is that the full number of threads of the compressor member 12 is always in engagement, and stripping of threads and consequent loss of the compressing member cannot possibly occur. At the same time there is no impairment of the facility with which the cup may be filled, the aperture 14 being made quite large and giving free access to the interior of the cup.

By virtue of the provision of the spring pressed piston, even though the compressor after being closed is carelessly given only a couple of turns, the grease is yieldingly pressed forward, and a substantially fixed quantity of it fed forward not at once, but by degrees as it is needed. In the old form of compressor, when a couple of turns were taken the measured quantity of grease is immediately forced out into the bearing, and as soon as the bearing becomes sufficiently heated to melt it, it runs out, and very soon the bearing is improperly supplied with lubricant. Through the proportioning of the range of movement of the piston to the total range of movement of the compressor member 12, as specified, at each adjustment of the compressor, (the member 12 being screwed up hard against the grease) the same quantity of grease is fed to the bearing.

In the form of my device shown in Fig. 2, the aperture 14 is formed in the bushing 10 instead of in the compressor member 12, the bushing 10 being made of greater length for this purpose, and its exterior screw threads being terminated at a point below its upper end. The aperture as in case of the form of Fig. 1 is closed after the filling of the cup by the screwing in of the compressor member 12, the piston 15 in this case being positioned with its lower face substantially on a level with the bottom end of the compressor member 12.

The form of Fig. 3 differs from both the previous forms in the structure of the bushing 10, this structure taking the form of a cap or what is commonly known in the pipe-fitters' art as a "reducing coupling". It is to be understood that the two forms of these bushings disclosed in Figs. 1 and 2, and 3 respectively are equivalents as far as my invention is concerned. The advantage of the form in Fig. 3 is that the compressor member 12 may more nearly fill the cup 11 formed on the rod. At present, the cups 11 are interiorly threaded, but it is my expectation that they will be exteriorly threaded on new locomotives which are equipped with the lubricating cup of my invention.

The form of my invention of Fig. 4 differs from the preceding forms in that the yieldingly operating piston 15 and its appurtenances are omitted, the grease being fed by the direct pressure of the member 12 at the time of manual adjustment. By virtue of the construction of the bushing 10 and the provision on compressor member 12 of retaining means 13 and the filling aperture 14, this form of compressor possesses all of the sturdiness and durability of the preceding forms, but is deficient in feeding.

I am aware that the caps and compressing elements of lubricating devices have heretofore been provided with means for preventing their removal from the body of the grease cup, such for instance as the patents to Harvey No. 538,516, April 30, 1905, and McDonnell No. 904,554, November 24, 1908, and I do not claim broadly such a compressor. It will be readily seen that the construction which I claim is quite different from the constructions disclosed in these references or others like them which I know to exist, and further that the compressor cup of the construction which I claim meets conditions of service which the devices of the prior art specified cannot meet. Further I desire to cover in the annexed claims all forms of my invention which do not depart from the generic spirit thereof.

What I claim is:

1. A grease compressor for engine rods comprising a bushing adapted to be threaded into the rod, a compressing member threaded into said bushing from the lower end thereof and having an annular shoulder on its lower end preventing its removal from the bushing by way of the top thereof, said compressing member having also a laterally disposed aperture for the introduction of grease exposed when the compressing member projects its greatest extent from the top of said bushing, and closed by screwing said compressing member into said bushing.

2. A grease compressor for engine rods comprising an exteriorly and interiorly threaded bushing, together with an exteriorly threaded compressing member screwed into said bushing from the bottom thereof and having means on its lower end preventing disengagement of said screw threads and the removal of said compressing member by way of the top of the bushing, said compressing member being recessed from the bottom up and having a laterally disposed aperture communicating with said recess and exposed when said compressing member is withdrawn from the top of said bushing to its limit, but closed when said compressor member is screwed down into said bushing.

3. A grease compressor for engine rods comprising an annular bushing of substantially uniform diameter adapted to be threaded onto the rod, and a grease compressing member threaded into said bushing and provided with means engaging the under side of the bushing and preventing disengagement of said threads and removal thereof by way of the top of bushing, one of said elements having a laterally disposed aperture for the introduction of grease, opened when said compressor member is screwed out of the top of said bushing to its limit, and closed by screwing said compressor member into the bushing.

4. A grease compressor for engine rods comprising a bushing adapted to be threaded onto the rod, and a grease compressing member threaded into said bushing and provided with means preventing disengagement of said threads and removal thereof by way of the top of bushing, one of said elements having a laterally disposed aperture for the introduction of grease, opened when said compressor member is screwed out of the top of said bushing to its limit, said compressor member being recessed from its bottom upwardly, and a spring pressed piston located in said recess, and adapted to engage and press upon the grease when said member is screwed down into the bushing.

5. A grease compressor for engine rods comprising a bushing adapted to be threaded onto the rod, and a grease compressing member threaded into said bushing and provided with means preventing disengagement of said threads and removal thereof by way of the top of the bushing, one of said elements having a laterally disposed aperture for the introduction of grease, opened when said compressor member is screwed out of the top of said bushing to its limit, said compressor member being recessed from the bottom, and a spring pressed piston in said recess the bottom of which piston lies approximately at the top of said aperture when said compressor member is in its uppermost position, but which is adapted to bear upon and compress the introduced grease when said member is screwed down into the bushing.

6. A grease compressor for engine rods comprising a bushing adapted to be threaded onto the rod, and a grease compressing member threaded into said bushing and provided with means preventing disengagement of said threads and removal thereof by way of the top of the bushing, one of said elements having a laterally disposed aperture for the introduction of grease, opened when said compressor member is screwed out of the top of said bushing to its limit, said compressor member being recessed from the bottom, and a spring pressed piston in said recess having a limited and small range of movement less than the range of movement of said compressor member in said bushing, and adapted to bear upon and compress the introduced grease when said member is screwed into said bushing.

7. A grease compressor for engine rods comprising an annular bushing of substantially uniform diameter adapted to be threaded onto the rod, and a grease compressing member threaded into said bushing and provided with means engaging the underside of the bushing and preventing disengagement of its threads and removal by way of the top of the bushing, said compressor member being recessed from the bottom and having a laterally disposed aperture for the introduction of grease through said recess, said aperture being opened when said compressor member is screwed out of the top of said bushing to its limit, and closed by the telescoping of the parts when said compressor member is screwed into the bushing.

8. A grease compressor for engine rods comprising an annular bushing of substantially uniform diameter adapted to be threaded onto the rod, and a grease compressing member threaded into said bushing and provided with means engaging the underside of the bushing and preventing disengagement of its threads and removal by way of the top of the bushing, said compressor member being recessed from the bottom and having a laterally disposed aperture for the introduction of grease through said recess, said aperture being opened when said compressor member is screwed out of the top of said bushing to its limit, and closed by the telescoping of the parts when said compressor member is screwed into the bushing, and a jam nut threaded onto the exterior of said compressor member and adapted to bear upon said bushing and clamp the parts firmly in adjusted positions.

9. A grease compressor for engine rods comprising a cup structure formed on the rod, an annular bushing of substantially uniform diameter adapted to be threaded onto the cup from the top, and a grease compressing member threaded into said bushing and provided with means engaging the underside of said bushing and preventing disengagement of its threads and removal by way of the top of the bushing, one of said elements having a laterally disposed aperture for the introduction of grease, opened when said compressor member is screwed out of the top of said bushing to its limit, and closed by the telescoping of the parts when said member is screwed into the bushing.

10. A grease compressor for engine rods comprising a bushing adapted to be threaded onto a rod, and a grease compressing member threaded into said bushing and provided with means preventing disengagement of its threads and removal by way of the top of the bushing, one of said elements having a laterally disposed aperture for the introduction of grease opened when said compressor member is screwed out of the top of said bushing to its limit, said compressor member being recessed from the bottom, and a spring pressed piston in said recess having a limited and small range of movement less than the range of movement in said compressor member in said bushing, and the bottom of which lies approximately at the top of said aperture when said compressor member is in its uppermost position, but is adapted to bear upon and compress the introduced grease when said compressor member is screwed down into said bushing.

In testimony whereof I affix my signature in presence of two witnesses.

JAMES E. McDANIEL.

Witnesses:
W. L. KELLY,
W. J. CONWAY.